(12) United States Patent
Demmon

(10) Patent No.: US 7,356,574 B2
(45) Date of Patent: Apr. 8, 2008

(54) APPARATUS AND METHOD FOR PROVIDING DYNAMIC AND AUTOMATED ASSIGNMENT OF DATA LOGICAL UNIT NUMBERS

(75) Inventor: Nick Demmon, Oxnard, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 773 days.

(21) Appl. No.: 10/372,088

(22) Filed: Feb. 25, 2003

(65) Prior Publication Data
US 2004/0167972 A1  Aug. 26, 2004

(51) Int. Cl.
*G06F 15/16* (2006.01)
(52) U.S. Cl. .................. 709/219; 709/217; 709/218
(58) Field of Classification Search ................ 709/217, 709/218, 219
See application file for complete search history.

(56) References Cited

U.S. PATENT DOCUMENTS

| | | | | |
|---|---|---|---|---|
| 5,790,773 A | * | 8/1998 | DeKoning et al. | 714/6 |
| 5,799,323 A | * | 8/1998 | Mosher et al. | 707/202 |
| 5,953,513 A | * | 9/1999 | Saiki et al. | 710/62 |
| 6,115,744 A | * | 9/2000 | Robins et al. | 709/227 |
| 6,148,412 A | * | 11/2000 | Cannon et al. | 714/6 |
| 6,343,324 B1 | * | 1/2002 | Hubis et al. | 709/229 |
| 6,732,104 B1 | * | 5/2004 | Weber | 707/10 |
| 6,839,746 B1 | * | 1/2005 | Muthiyan et al. | 709/220 |
| 7,222,172 B2 | * | 5/2007 | Arakawa et al. | 709/224 |

* cited by examiner

*Primary Examiner*—Ario Etienne
*Assistant Examiner*—Avi Gold

(57) ABSTRACT

A method and corresponding apparatus for providing dynamic and automated assignment of data logical unit numbers (LUNs) use an interface on a management server to control data backup process in a storage area network (SAN). The management server may keep a master list of which LUNs each server or host is allowed to access. Data backup may be accomplished using backup software. The method creates a snapshot LUN, i.e., an exact copy of an existing LUN at a given point in time, and creates a unique identifier, referred to as a snapshot identifier, corresponding to the snapshot LUN. The interface uses the snapshot identifier to control access to the snapshot LUN. The backup software may request that the management server assign the snapshot LUN to a backup server so that the backup server can access the snapshot LUN for data backup purposes.

20 Claims, 4 Drawing Sheets

APPARATUS AND METHOD FOR PROVIDING DYNAMIC AND AUTOMATED ASSIGNMENT OF DATA LOGICAL UNIT NUMBERS

TECHNICAL FIELD

The technical field relates to storage area networks, and, in particular, to systems that provide dynamic and automated assignment of data logical unit numbers for data backup.

BACKGROUND

In a storage area network (SAN), a logical unit is a set of storage on a particular array that is designed to act as a single storage unit. A logical unit number (LUN) is a unique identifier used on a bus that enables the bus to differentiate between separate devices (each of which is a logical unit). Each LUN is a unique number that identifies a specific logical unit, which may be an end user, a file, or an application program. Different hosts or servers can communicate to an array at different addresses and access, at the same time, different LUNs that are stored on the same array.

In a SAN, crucial data on one server are usually backed up using a backup server. The data backup may be accomplished by creating a snapshot LUN, which represents an exact copy of an existing LUN at a given point in time. The snapshot LUN can be accessed by the backup server and then backed up to a disk or tape. However, in a secure SAN environment, if a LUN is not specifically configured as accessible to the backup server, the LUN will not be visible to that backup server. As a result, the data backup process may be impeded.

Previous attempts to solve data backup problems have been ineffective. One attempted solution is to use less secure switch zoning. The SAN is loosely configured, which allows multiple servers (including the backup server) access to the exact same storage. Allowing access of a LUN by a server other than the one that is currently using the LUN can result in massive data loss. Thus, extreme care must be taken to configure each server to prevent data loss.

Another attempted solution is to use switch or array-based LUN security, where either the array or the switch limits the LUNs that a particular server can access. At the time of backup, the switch can be reconfigured to allow the alternate server access to the snapshot LUN. However, since backup software usually runs automatically, the backup software must have prior knowledge of the type of LUN security methods that are in place. The backup software must have knowledge of how to configure all of the LUN security methods. The backup software must be configured with a variety of usernames and passwords of accounts that are authorized to make changes to each device providing the LUN security. If the backup software is not properly configured, manual intervention is required after the creation of the snapshot LUN and before the backup takes place.

Another attempted solution uses host-based LUN security, which requires the server itself to be programmed to limit which LUNs the server is allowed to access. This self-policing solution may minimize the chances of one server accidentally affecting storage being accessed by a different server. However, for this kind of security to be effective, each server must keep a master list of which LUNs the server is allowed to access. A recently created snapshot LUN may be unknown to the master list, and needs to be discovered prior to being assigned to the backup server.

SUMMARY

A method for providing dynamic and automated assignment of data logical unit numbers (LUNs) includes creating a snapshot LUN that represents an exact copy of an existing LUN at a given point in time. The snapshot LUN is assigned a unique identifier. The method further includes passing the unique identifier to a backup server. If the backup server cannot access the snapshot LUN based on the unique identifier, the snapshot LUN is assigned to the backup server. The backup server then backs up data represented by the LUN.

A corresponding apparatus for providing dynamic and automated assignment of data LUNs includes servers that access data represented by LUNs on storage devices. Each storage device includes a snapshot LUN, which represents an exact copy of an existing LUN at a given point in time. The apparatus further includes backup software that assigns a unique identifier to the snapshot LUN and passes the unique identifier to a backup server, and an interface that assigns the snapshot LUN to the backup server to complete the data backup.

DESCRIPTION OF THE DRAWINGS

The embodiments of the method and apparatus for providing dynamic and automated assignment of data logical unit numbers (LUNs) in a secure storage area network (SAN) environment will be described in detail with reference to the following figures, in which like numerals refer to like elements, and wherein.

DETAILED DESCRIPTION

A method and corresponding apparatus for providing dynamic and automated assignment of data logical unit numbers (LUNs) use an interface on a management server to control data backup process in a storage area network (SAN). The management server may keep a master list of which LUNs each server or host is allowed to access. Data backup may be accomplished using backup software. The method creates a snapshot LUN, i.e., an exact copy of an existing LUN at a given point in time, and creates a unique identifier, referred to as a snapshot identifier, corresponding to the snapshot LUN. The interface uses the snapshot identifier to control access to the snapshot LUN. The backup software may request that the management server assign the snapshot LUN to a backup server so that the backup server can access the snapshot LUN for data backup purposes.

The unique identifier for the snapshot LUN may operate in any JAVA® runtime environment in the SAN. The method for providing dynamic and automated assignment of data LUNs may be implemented with a storage area manager (SAM), a storage data protector, and a storage allocater, such as the OPENVIEW® SAM, storage data protector, and storage allocater.

The SAM supports enterprise storage utility services with integrated tools that help information technology (IT) departments reduce storage management costs, protect existing storage investments, efficiently utilize resources, and deliver guaranteed quality of service to customers, partners, and employees. The SAM enables system administrators to simplify and automate management of multivendor storage resources across disk, tape, direct-attach, and networked storage infrastructures. The SAM can also centrally manage and monitor availability, performance, usage, growth, and cost across a distributed enterprise. Further, the SAM enables system administrators to optimize resource utilization and operations, and to seamlessly integrate storage and storage services with the enterprise-wide IT service management system.

The storage data protector delivers levels of recovery in a service-driven management approach to protect business-critical information from any risk of loss. The storage data protector typically uses mirroring and snapshot technologies and utilizes disk-based recovery. The storage allocater controls SAN storage at the device or LUN level, and creates a scalable storage asset pool that allows devices to be assigned exclusively and securely to designated hosts on the SAN using a graphical user interface. The storage allocater's intuitive user interface lets users conveniently and confidently assign storage to one or more hosts and be assured that only specified hosts have access.

Figure 1:
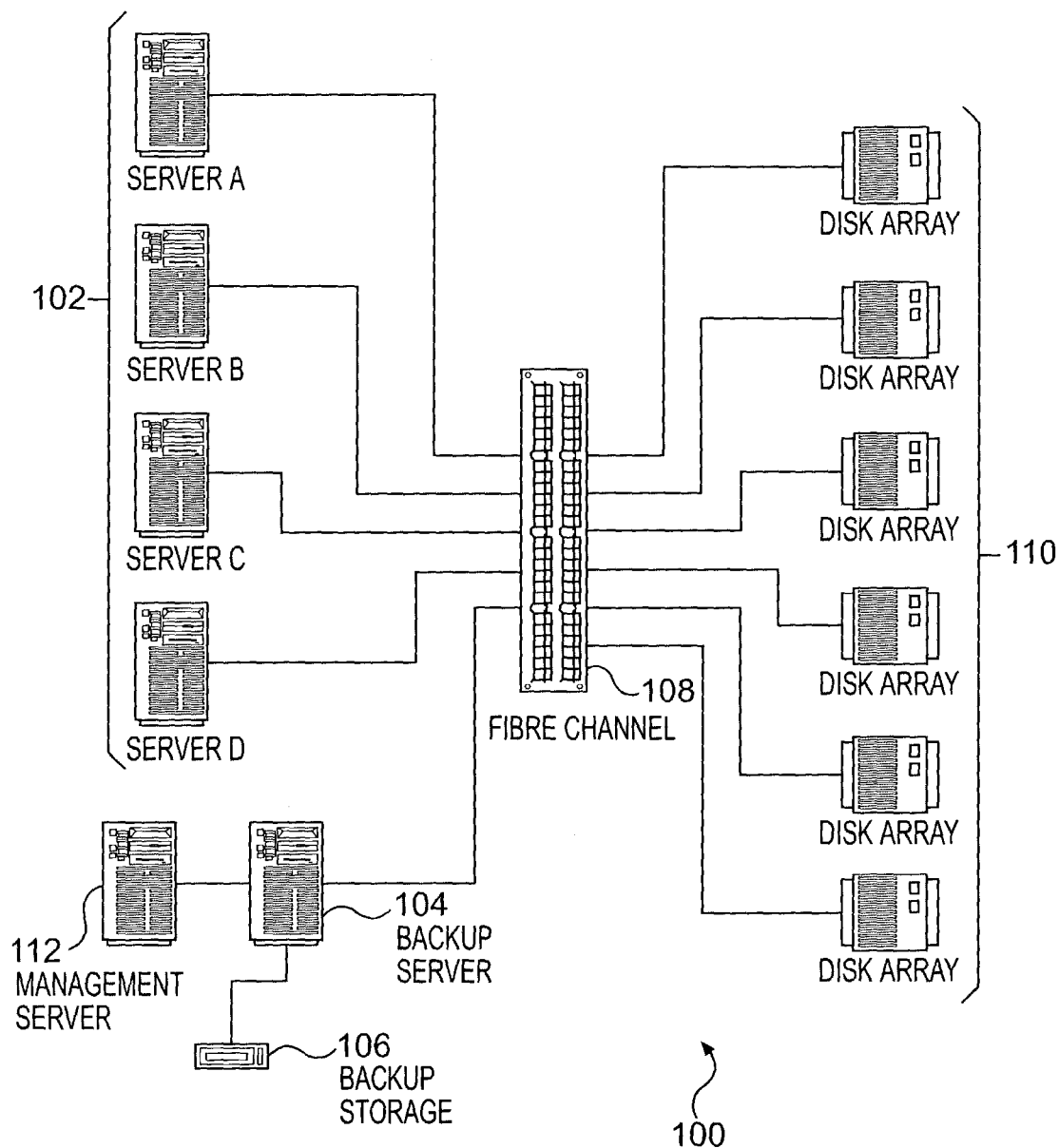
FIG. 1 illustrates an exemplary storage area network (SAN) that provides dynamic and automated assignment of data logical unit numbers (LUNs)

FIG. 1 illustrates an exemplary storage area network (SAN) 100 that provides dynamic and automated assignment of data logical unit numbers (LUNs). The SAN 100 may includes multiple servers, collectively designated by the reference numeral 102, a fiber channel switch 108, and multiple storage devices or disk arrays, collectively designated by the reference numeral 110. The SAN 100 may also include a backup server 104, connected to a management server 112 and a backup storage 106, such as a tape drive, for data backup.

The backup server 104 may have access to all LUNs on all of the disk arrays 110. Therefore, the backup server 104 can transfer the contents of any LUN to the backup storage 106. The servers 102 may access data on all of the disk arrays 110. With switch-based security measures, the fiber channel switch 108 controls which components within the SAN 100 are allowed to communicate with other components. With array-based security measures, the disk arrays 110 can restrict the servers' access to various LUNs on the disk arrays 110.

Figure 2:
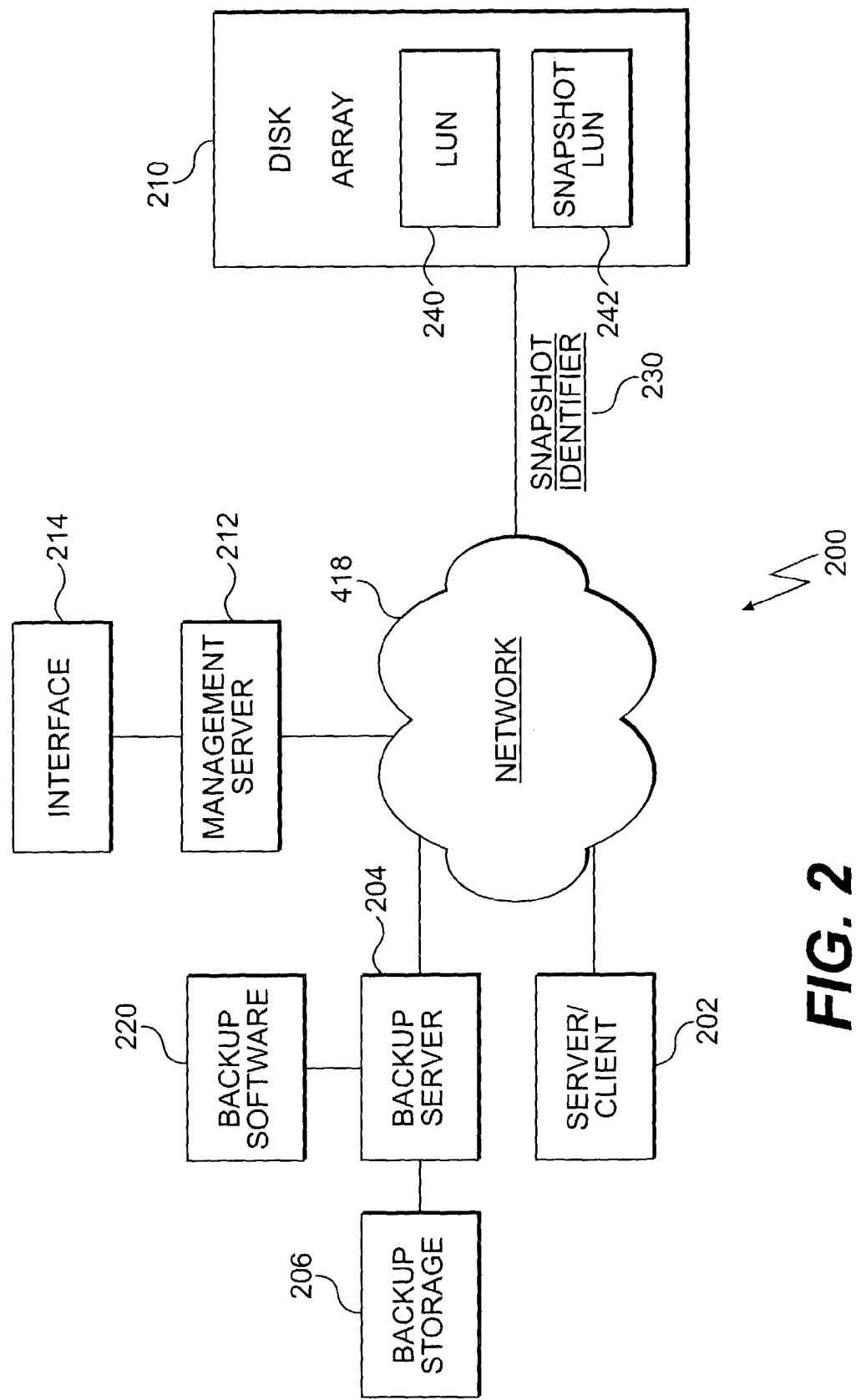
FIG. 2 illustrates another exemplary SAN that uses an interface on a management server to provide dynamic and automated assignment of data LUNs.

FIG. 2 illustrates another exemplary SAN 200 that uses an interface 214 on a management server 212 for assigning data LUNs for data backup. The management server 212 may keep a master list of which LUNs each server 202 is allowed to access. During operation of a SAN, data being accessed by a server/client 202 may be backed up by a backup server 204 using backup software 220. During data backup, the server/client 202 may become a client to the backup server 204 and the management server 212. In this embodiment, the backup server 204, the server/client 202, and the management server 212 communicate through a network 418.

During the SAN operation, the server/client 202 may be accessing the data represented by a LUN 240 at the disk array 210. In order to back up the same data without interrupting the server/client's operation, a snapshot LUN 242 may be created by the backup software 220. The snapshot LUN 242 represents an exact copy of an existing LUN 240 at a given point in time. The backup software 220 then automatically assigns a unique identifier, referred to as a snapshot identifier 230, to the snapshot LUN 242 to be passed to the backup server 204.

Next, the backup server 204 searches for the LUN 240 that matches the snapshot identifier 230. If the backup server 204 can access the snapshot LUN 242, then the backup may be executed by storing the data represented by the LUN 240 to a backup storage 206, such as a disk or a tape. If, however, the backup server 204 cannot access the snapshot LUN 242, the backup software 220 may request that the management server 212 assign the snapshot LUN 242 to the backup server 204 using the interface 214, which may be an application protocol interface (API), command line utility, or network protocol, for example. The backup software 220 may load the interface 214. A function in the interface 214 may log in to the management server 212 using an account/password that is passed in from the backup software 220. Another function in the interface 214 may then assign the snapshot LUN 242 to the backup server 204. The interface 214 allows the backup server 204 to access the snapshot LUN 242 for backup purposes. The backup server 204 may then access the snapshot LUN 242 and store the data to the backup storage 206. Thereafter, the management server 212 may release the backup server's access to the snapshot LUN 242 using, for example, yet another function in the interface 214.

The management server 212, through the interface 214, controls access by the backup server 204 to the LUN 240 and the snapshot LUN 242. The backup server 204 may gain access to a newly-created snapshot LUN 242 for the specific task of data backup. Therefore, the backup software 220 does not need to know the security measures in the SAN 200.

In the embodiment disclosed in FIG. 2, the network 418 transports both SAN traffic and Internet networking protocols (TCP/IP) traffic. For example, creation of a snapshot LUN 240, searching by the backup server 204 for the LUN 240 that matches the snapshot identifier 230, and backup of data to the backup storage 206 are activities that involve storage area traffic. Passing of the snapshot identifier 230 to the backup server 204, and assignment of the snapshot LUN 242 to the backup server 204 utilize TCP/IP traffic over the network 418.

Figure 3:
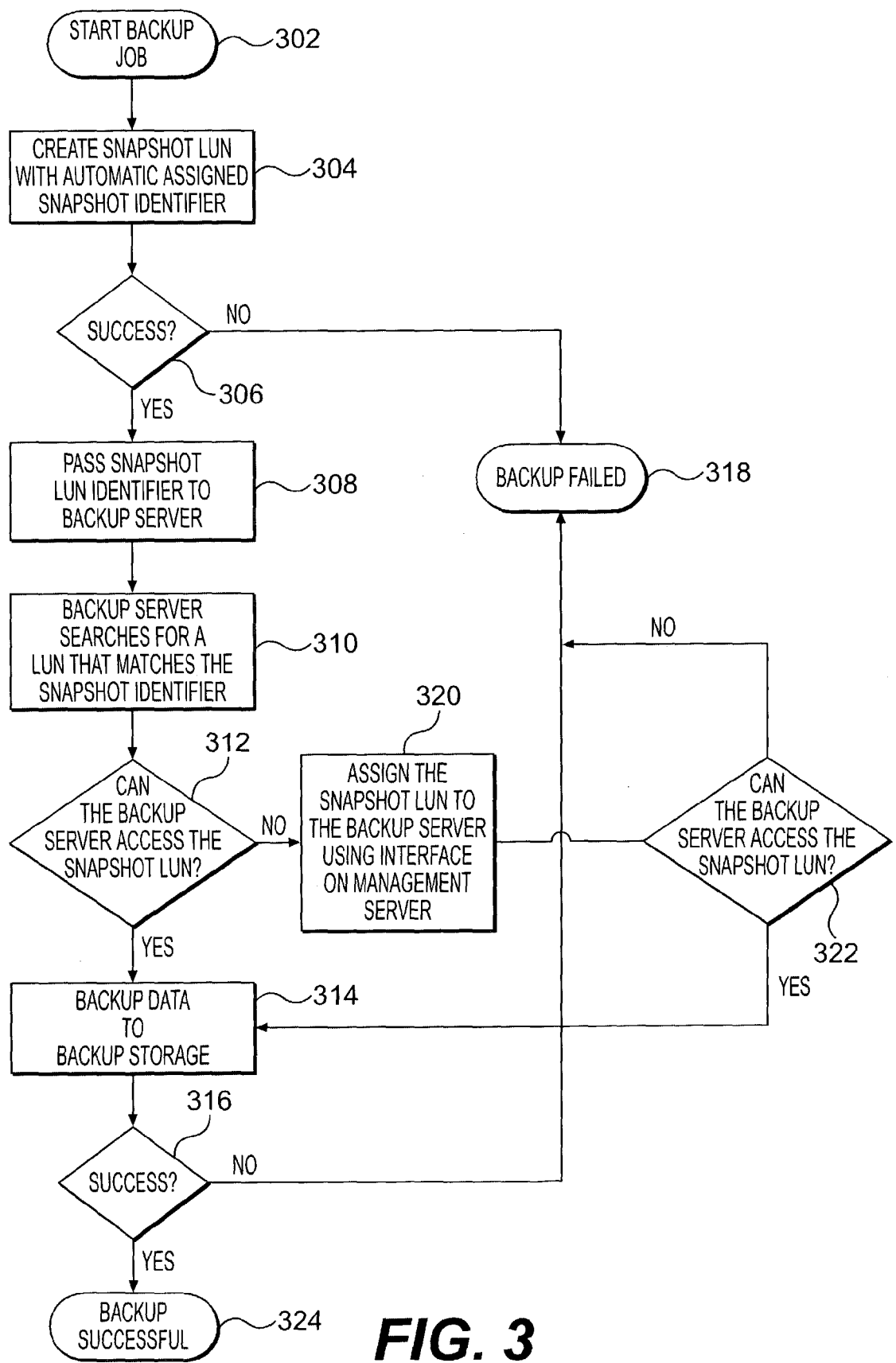
FIG. 3 is a flow chart illustrating an exemplary method for providing dynamic and automated assignment of data LUNs in a secure SAN environment.

FIG. 3 is a flow chart illustrating an exemplary method for providing dynamic and automated assignment of data LUNs in a secure SAN environment. After a backup operation begins (block 302), the snapshot LUN 242 may be created by the backup software 220 (block 304). The snapshot LUN 242 represents an exact copy of the existing LUN 240 at a given point in time. The backup software 220 automatically assigns the snapshot identifier 230 to the snapshot LUN 242. If the creation of the snapshot LUN 242 is successful (block 306), the backup software 220 passes the snapshot identifier 230 to the backup server 204 (block 308). If the snapshot LUN 242 is not successfully created, the backup operation fails (block 318).

After the snapshot identifier 230 is passed to the backup server 204 (block 308), the backup server 204 searches for the LUN 240 that matches the snapshot identifier 230 (block 310). If the backup server 204 can access the snapshot LUN 242 (block 312), the backup server 204 stores the data represented by the LUN 240 to the backup storage 206 (block 314). If the data is successfully saved to the backup storage (block 316), the backup is successful (block 324).

Otherwise, the backup fails (block 318).

Returning to block 312, if the backup server 204 cannot access the snapshot LUN 242, the interface 214 residing on the management server 212 assigns the snapshot LUN 242 to the backup server 204 (block 320). If the backup server 204 can access the newly assigned snapshot LUN 242, the backup server 204 completes the data backup by storing the data represented by the LUN 240 to the backup storage 206 (block 314). If the backup server cannot access the newly assigned snapshot LUN 242, the backup fails (block 318).

The method of dynamic and automated assignment of data LUNs eliminates the need for the management server 212 to discover the snapshot LUN 242 prior to assigning the snapshot LUN 242 to the backup server 204. The management server 212 controls and monitors the dynamic creation of the snapshot LUN 242, rendering a future directed discovery of the snapshot LUN 242 a trivial matter. With host-based security measures, the existence of the snapshot LUN 242 does not need to be verified prior to assigning the snapshot LUN 242 to the backup server 204. The backup software 220 may issue a directed discovery on the backup server 204, and the snapshot LUN 242 may be accessible to the backup server 204 for data backup. Thus, the method for assignment of the data LUNs creates a centralized knowledge of security methods, which allows access in all situations with one command.

The method for providing dynamic and automated assignment of data LUNs may be used in a wide variety of backup options in a variety of security situations. For example, the principles disclosed herein can be incorporated into array-based and switch-based LUN security methods. The interface 214 may allow the backup server 204 access to the snapshot LUN 242 by reconfiguring all components along the data path that may block the access. The access control may be accomplished using one simple assignment command. The interface 214 can manage disk array 210 access control in a generic manner, so that the backup software 220, when used in combination with the interface 214, does not need to learn the method of access control for each disk array 210.

Figure 4:
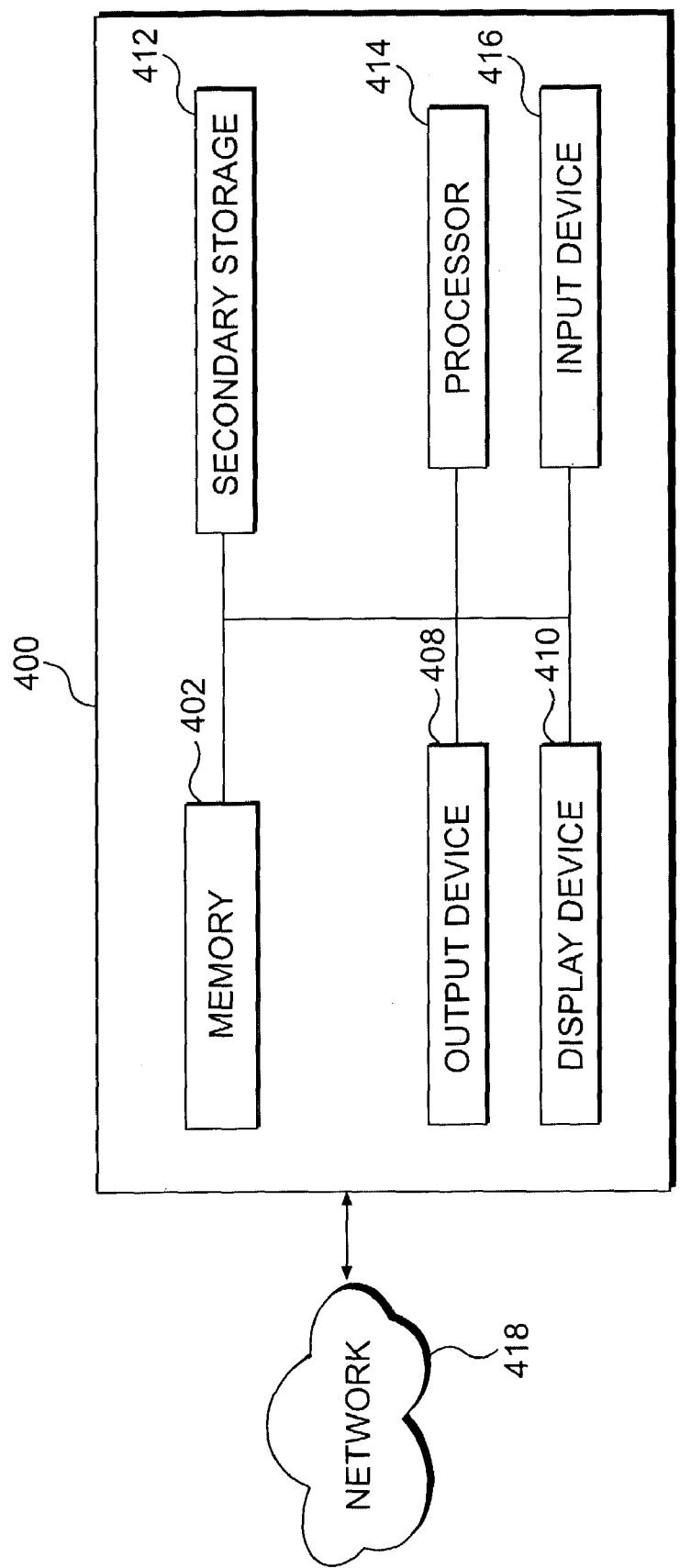
FIG. 4 illustrates exemplary hardware components of a computer that may be used in connection with the method for providing dynamic and automated assignment of data LUNs in a secure SAN environment.

FIG. 4 illustrates exemplary hardware components of a computer 400 that may be used in connection with the method for providing dynamic and automated assignment of data LUNs in a secure SAN environment. The computer 400 includes a connection 420 with the network 418 such as the Internet or other type of computer or telephone network. The computer 400 typically includes a memory 402, a secondary storage device 412, a processor 414, an input device 416, a display device 410, and an output device 408.

The memory 402 may include random access memory (RAM) or similar types of memory. The secondary storage device 412 may include a hard disk drive, floppy disk drive, CD-ROM drive, or other types of non-volatile data storage, and may correspond with various databases or other resources. The processor 414 may execute information stored in the memory 402 or the secondary storage 412, or received from the network 418. The input device 416 may include any device for entering data into the computer 400, such as a keyboard, keypad, cursor-control device, touch-screen (possibly with a stylus), or microphone. The display device 410 may include any type of device for presenting visual image, such as, for example, a computer monitor, flat-screen display, or display panel. The output device 408 may include any type of device for presenting data in hard copy format, such as a printer, and other types of output devices including speakers or any device for providing data in audio form. The computer 400 can possibly include multiple input devices, output devices, and display devices.

Although the computer 400 is depicted with various components, one skilled in the art will appreciate that the computer 400 can contain additional or different components. In addition, although aspects of an implementation consistent with the method for providing dynamic and automated assignment of data LUNs are described as being stored in memory, one skilled in the art will appreciate that these aspects can also be stored on or read from other types of computer program products or computer-readable media, includes storage media such as secondary storage devices, including hard disks, floppy disks, or CD-ROM; and transmission media such as a carrier wave from the Internet or other network; or other forms of RAM or ROM. The computer-readable media may include instructions for controlling the computer 400 to perform a particular method.

While the method and apparatus for providing dynamic and automated assignment of data LUNs in a secure SAN environment have been described in connection with an exemplary embodiment, those skilled in the art will understand that many modifications in light of these teachings are possible, and this application is intended to cover any variations thereof.

What is claimed is:

1. A method for providing dynamic and automated assignment of data logical unit numbers (LUNs), comprising:
    creating a snapshot LUN that represents an exact copy of an existing LUN at a given point in time, wherein the snapshot LUN is assigned a unique identifier;
    passing the unique identifier to a backup server;
    if the backup server cannot access the snapshot LUN based on the unique identifier, requesting a management server to assign the snapshot LUN to the backup server; and
    if the management server assigns the snapshot LUN to the backup server, backing-up data represented by the LUN using the backup server.

2. The method of claim 1, wherein the backing-up step includes copying the data to a backup storage.

3. The method of claim 1, further comprising searching for a LUN that matches the unique identifier.

4. The method of claim 1, wherein the unique identifier assigned to the snapshot LUN is a snapshot identifier.

5. The method of claim 1, further comprising releasing the backup server's access to the snapshot LUN after the data backup.

6. The method of claim 1, further comprising assigning the snapshot LUN using an interface on a management server.

7. The method of claim 1, further comprising assigning the snapshot LUN using an application protocol interface (API).

8. The method of claim 1, further comprising using a storage area network (SAN) that uses host-based security in connection with the data backup.

9. The method of claim 1, further comprising using a storage area network (SAN) that uses array-based security in connection with the data backup.

10. The method of claim 1, further comprising using a storage area network (SAN) that uses switch-based security in connection with the data backup.

11. An apparatus for providing dynamic and automated assignment of data logical unit numbers (LUNs), comprising:
    servers that access data represented by LUNs on one or more storage devices, each storage device comprising a snapshot LUN that represents an exact copy of an existing LUN at a given point in time;

backup software that assigns a unique identifier to the snapshot LUN and passes the snapshot identifier to a backup server to complete the data backup; and an interface that assigns the snapshot LUN to the backup server for the data backup if the backup server is not able to access the snapshot LUN using the snapshot identifier.

12. The apparatus of claim 11, further comprising a backup storage that stores data for data backup.

13. The apparatus of claim 12, wherein the backup storage is a backup tape.

14. The apparatus of claim 11, wherein the interface resides on a management server, and wherein the management server communicates with the backup server using a network.

15. The apparatus of claim 11, wherein one or more of the storage devices are disk arrays.

16. The apparatus of claim 11, wherein the unique identifier is a snapshot identifier.

17. The apparatus of claim 11, wherein the interface is an application protocol interface (API).

18. The apparatus of claim 11, wherein the interface releases the snapshot LUN from the backup server after the data backup is completed.

19. A computer readable storage medium storing instructions for dynamic and automated assignment of data logical unit numbers (LUNs), the instructions comprising:

creating a snapshot LUN that represents an exact copy of an existing LUN at a given point in time, wherein the snapshot LUN is assigned a snapshot identifier;

passing the snapshot identifier to a backup server;

if the backup server cannot access the snapshot LUN based on the snapshot identifier, requesting a management server to assign the snapshot LUN to the backup server; and if the management server assigns the snapshot LUN to the backup server, backing-up data represented by the LUN using the backup server.

20. The computer readable storage medium of claim 19, further comprising instructions searching for a LUN that matches the snapshot identifier.

* * * * *

UNITED STATES PATENT AND TRADEMARK OFFICE
CERTIFICATE OF CORRECTION

| | | |
|---|---|---|
| PATENT NO. | : 7,356,574 B2 | Page 1 of 1 |
| APPLICATION NO. | : 10/372088 | |
| DATED | : April 8, 2008 | |
| INVENTOR(S) | : Nick Demmon | |

It is certified that error appears in the above-identified patent and that said Letters Patent is hereby corrected as shown below:

In column 8, line 20, in Claim 20, after "instructions" insert -- for --.

Signed and Sealed this

Fourth Day of August, 2009

JOHN DOLL
*Acting Director of the United States Patent and Trademark Office*